March 21, 1967 G. C. RIECKEN 3,309,812
FISH TRAP
Filed Oct. 13, 1964 2 Sheets-Sheet 1

INVENTOR.
GEORGE C. RIECKEN
BY
Attorney

INVENTOR.
GEORGE C. RIECKEN
BY
Warren D. Hackbert
Attorney

United States Patent Office 3,309,812
Patented Mar. 21, 1967

3,309,812
FISH TRAP
George C. Riecken, 2154 Adams Ave.,
Evansville, Ind. 47714
Filed Oct. 13, 1964, Ser. No. 403,462
2 Claims. (Cl. 43—103)

The present invention relates to a fish trap, and more particularly to a new and novel minnow trap which is collapsible and, at the same time, unbreakable.

As is known, minnow traps are in widespread usage by fishermen, but the existing devices are generally cumbersome and bulky, requiring specialized handling during usage. More specifically, the conventional minnow trap now available is made from glass, which of course, is breakable, or, in the alternative, employs visible wire and netting with various types of frames, structures not lending to ease in transporting or in actual use.

By virtue of the instant invention, the applicant herein has provided a new and novel minnow trap which is completely collapsible and unbreakable, being of a size which can be conveniently carried on the person of a fisherman or in a tackle box. Briefly, the instant invention comprises a series of interconnected passageways which, when filled with water and having its pressure retained by a rolled filler tube, form an overall semi-rigid structure, without the necessity of a supplemental framework.

When in the aforesaid semi-rigid condition, the new and novel minnow trap reveals an opening at either end thereof through which a minnow or other fish can pass to feed at a bait container disposed therewithin. The instant fish trap is conveniently positionable in the water at the side of the fishing boat for the fisherman's ready use of the trapped minnows, and after fishing, is readily returned to its collapsed condition by draining the water therefrom through the unrolled filler tube, and folding the trap to its flattened state. The invention at hand is readily manufactured with a minimum of components, typically through the use of a heat sealable plastic material.

Accordingly, the principal object of the present invention is to provide a new and novel fish trap.

Another object of the present invention is to provide a new and novel fish trap which is collapsible and unbreakable.

A further object of the present invention is to provide a new and novel fish trap which is readily converted from a compact flattened or folded state to a semi-rigid usable structure through the introduction of a fluid.

A still further and more general object of the present invention is to provide a new and novel collapsible fish trap which is readily erected for use as well as readily collapsed after such use; which is conveniently carried on the user's person or with the user's gear without any danger of breakage; which presents economies for the manufacturer as well as the user; and, which affords advantages not available heretofore with existing fish traps.

Other objects and a better understanding of the present invention will become more apparent from the following description, take in conjunction with the accompanying drawings, wherein FIG. 1 is a view in front elevation of a fish trap in accordance with the teachings of the instant invention;

FIG. 4 is another view in front elevation, comparable to FIG. 1 but reduced in size, showing the applicant's new and novel fish trap in use;

FIG. 5 is a view in elevation of a bait holder forming part of the instant invention; and, FIG. 6 is a detailed view of the bait holder of FIG. 5, taken at line 6—6 of FIG. 5 and looking in the direction of the arrows.

Figure 1:
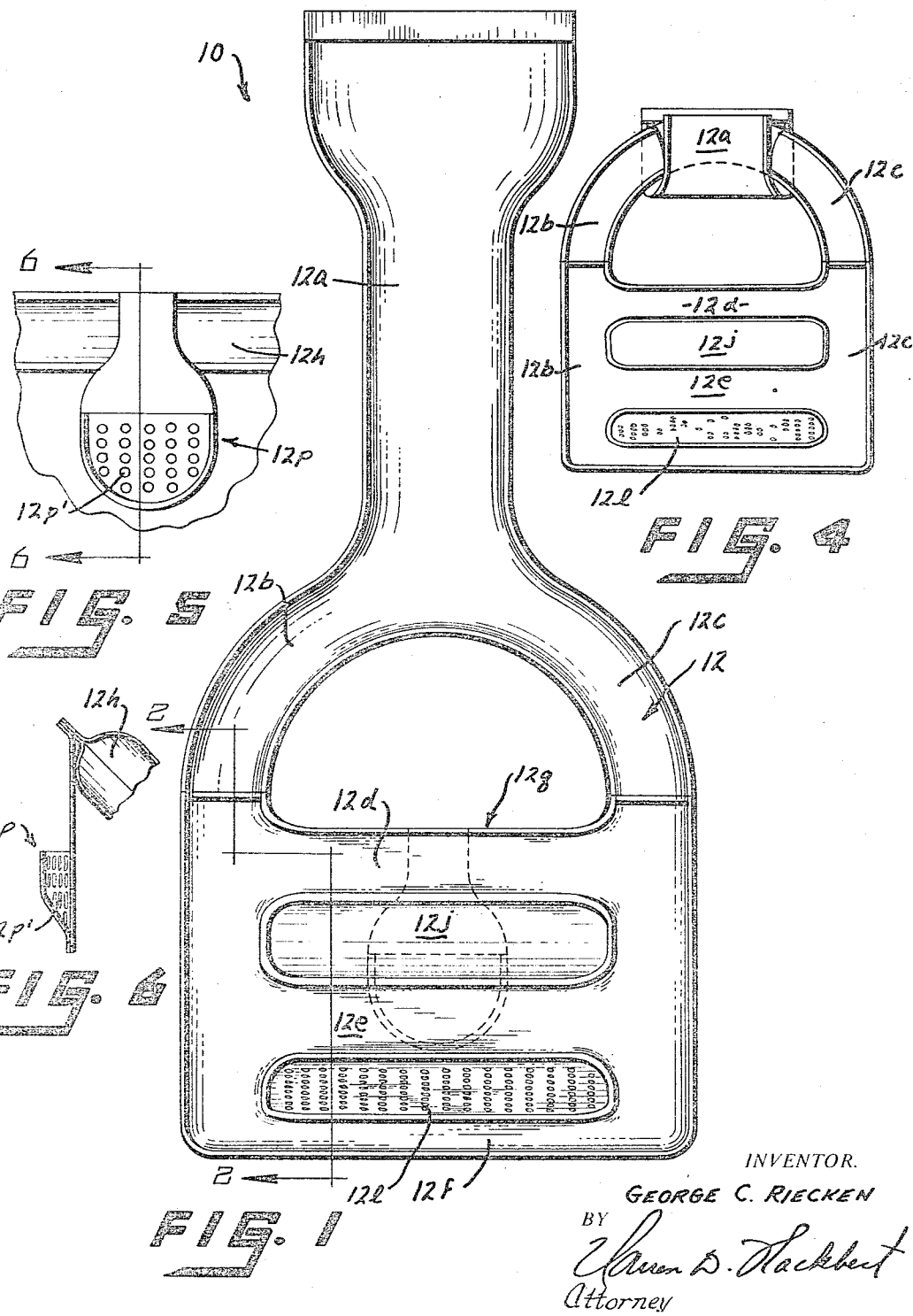

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel fish trap 10 typically comprises a body member 12 having an elongated portion 12a which serves as a filler tube. In a preferred embodiment of the invention, the body member 12 is made from a flexible unbreakable plastic material, such as sheet vinyl, for example, the latter being adaptable to heat seaming techniques for accomplishing ready assembly.

Figure 2:
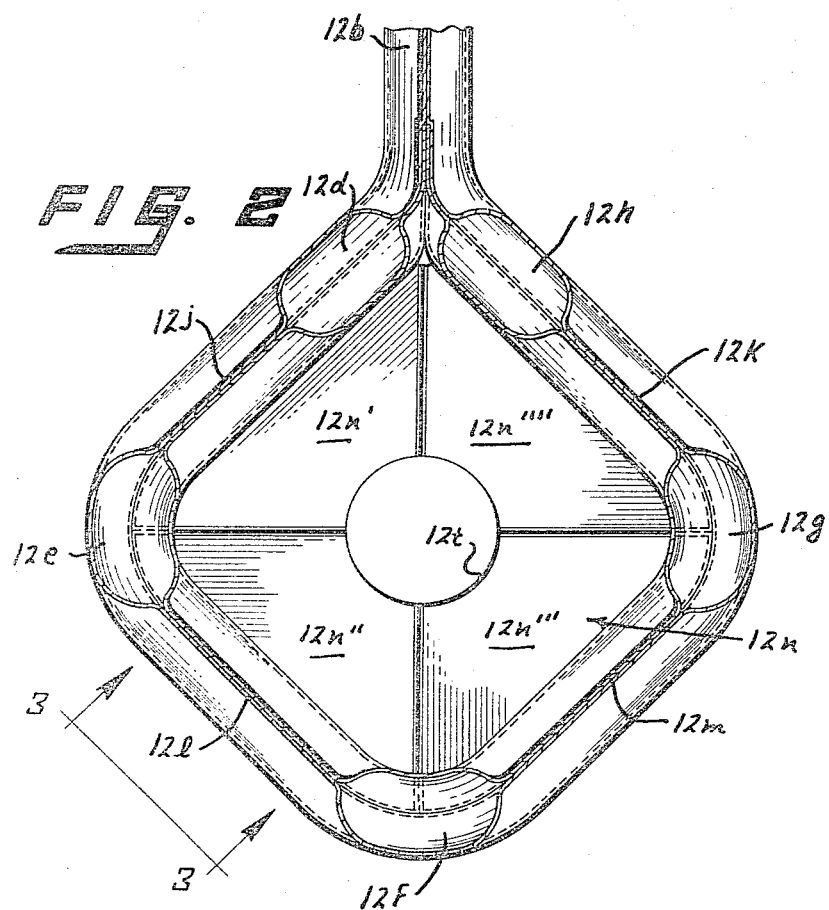
FIG. 2 is a view in vertical section, taken at line 2—2 of FIG. 1 and looking in the direction of the arrows, showing further details of the fish trap of such figure.

In any event, the elongated portion 12a of the body member 12 typically opens into diverging passageways 12b and 12c which respectively define the side edges of the body member 12, as should be apparent from considering FIGS. 1 and 2. Lateral passageways 12d, 12e, 12f, 12g and 12h interconnect the passageways 12b and 12c, thereby providing a communicating internal passageway system. In this regard, and as should be apparent from the discussion herebelow, the aforesaid passageways 12b, 12c, 12d, 12e, 12f, 12g and 12h define a semi-rigid supporting frame for the fish trap of the instant invention, when a fluid, such as water, for example, is introduced therein through the elongated portion 12a of the body member 12.

Figure 3:
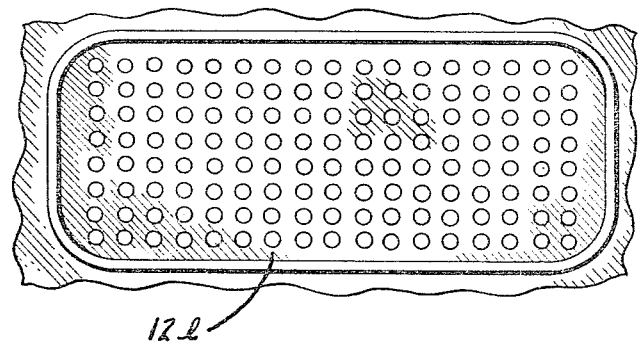
FIG. 3 is a fragmentary view in front elevation of a portion of the fish trap of FIGS. 1 and 2, looking generally in the direction of the arrows 3—3 of FIG. 2.

Disposed between the lateral passageways 12d and 12e, and 12g and 12h, respectively, are panel sections 12j and 12k, where patterns of openings are disposed through comparable panel sections 12l and 12m, respectively disposed between lateral passageways 12e and 12f, and 12f and 12g (see FIG. 3). Ends 12n of the body member 12 are typically arranged in inwardly disposed folds 12n', 12n'', 12n''' and 12n'''', forming cone-like recessed portions, where an opening 12t is centrally disposed therein, the latter being designed to pass a fish.

As mentioned hereabove, the invention utilizes flexible plastic material in its preferred embodiment, where the assembly thereof is readily accomplished through seams achieved by a heat sealing procedure. While the seams are not identified by reference numerals in the drawings, in one form of invention, as shown, two separate cut-out combinable plastic members are required for the entire fish trap.

With particular reference now to FIGS. 5 and 6, a bait holder 12p is typically disposed within the internal cavity defined by the fish trap 10, being supported, by way of example, on the lateral passageway 12h. The bait holder 12p typically serves as a pocket for receiving cheese or other edible material, where openings 12p' are customarily included in the assembly. In completing the assembly, an opening 12q into the internal cavity of the fish trap 10 is provided between the front and back portions thereof, permitting access to remove any captured fish.

In any event, and in use, water is introduced into the elongated portion 12a of the body member 12, causing a fielding of the passageways 12b, 12c, 12d, 12e, 12f, 12g and 12h, and causing the over-all structure to assume the shape of FIG. 2. In order to retain pressure and, hence, maintain the unit in its semi-rigid state, the elongated portion 12a is wrapped or rolled around itself, as in FIG. 4, where the passageways 12b and 12c, together with the rolled elongated portion 12a constitute a carrying handle for the device. The user then immerses the fish trap 10 into water, as along the side of a fishing boat, for example, and the fish, such as a minnow, for example, is lured into the trap through one of the openings 12t, and once captured finds it virtually impossible, or at least unlikely, to return through either of the openings 12t to freedom.

It should be apparent, therefore, that the fish trap 10 herein not only serves to capture fish, but to store same during fishing, for example, where, as mentioned hereabove, the fish may be readily removed by the user through the opening 12q. Although the discussion to this point is generally directed to use of the instant fish trap for recreational or vocational purposes, it is readily adaptable for use in survival kits or the like, where fish may be readily captured therein for human consumption.

When it is no longer desired to use the fish trap, and after removal of the captured fish and withdrawal of the trap from the water, the water therewithin is drained from the trap through the elongated portion 12a of the body member 12 after the latter is unrolled to its position of FIG. 1. Thereafter, the trap can be folded down to a flattened state and readily stored in a gear box, or even on the user's person, without any fear of breakage. The fish trap 10 is obviously light weight and, therefore, is readily transportable to its desired area of use.

From the preceding, it should be apparent that the applicant herein has provided a new and novel fish trap defined by a series of fluid carrying passageways which selectively form a semi-rigid over-all trap structure. The instant invention is completely collapsible and unbreakable, there being no auxiliary framework of any kind.

The fish trap described hereabove is, of course, susceptible to various changes within the spirit of the invention. For example, the trap may be designed into various other configurations, and additionally, may have several extra entrance cones, all, however, incorporating the principal of expanding into a semi-rigid structure by means of pressurized water-filled passageways. Thus, the above description should be considered illustrative, and not as limiting the scope of the following claims.

I claim:

1. A foldable fish trap comprising a plurality of hollow collapsible frame members adapted to receive and to be expanded by a liquid, said frame members being in communication to provide an internal passageway system for said liquid, and wall members interposed between and connecting adjacent frame members to form therewith a fish trapping cavity when said frame members are expanded by said liquid, at least one of said wall members having an opening therein to permit passage of fish into said fish trapping cavity.

2. The foldable fish trap of claim 1 wherein said passageway system includes a filler portion communicating therewith and foldable upon itself to retain said liquid therewithin.

References Cited by the Examiner
UNITED STATES PATENTS

| | | | |
|---|---|---|---|
| 1,336,356 | 4/1920 | Johnson | 43—105 |
| 1,976,134 | 10/1934 | McPike | 43—100 |
| 3,003,278 | 10/1961 | Armentrout | 43—103 |
| 3,082,564 | 3/1963 | Grace | 43—102 |
| 3,145,500 | 8/1964 | French et al. | 43—103 |

SAMUEL KOREN, *Primary Examiner.*

WARNER H. CAMP, *Examiner.*